United States Patent
Gradek

(10) Patent No.: US 9,901,043 B2
(45) Date of Patent: Feb. 27, 2018

(54) METHOD AND SYSTEM FOR SURFACE AND SUBSURFACE WATER RETENTION

(71) Applicant: Thomas Gradek, Rosemere (CA)

(72) Inventor: Thomas Gradek, Rosemere (CA)

(*) Notice: Subject to any disclaimer, the term of this patent is extended or adjusted under 35 U.S.C. 154(b) by 37 days.

(21) Appl. No.: 15/039,578

(22) PCT Filed: Dec. 4, 2013

(86) PCT No.: PCT/CA2013/050931
§ 371 (c)(1),
(2) Date: May 26, 2016

(87) PCT Pub. No.: WO2015/077862
PCT Pub. Date: Jun. 4, 2015

(65) Prior Publication Data
US 2017/0020090 A1    Jan. 26, 2017

Related U.S. Application Data

(60) Provisional application No. 61/908,927, filed on Nov. 26, 2013.

(51) Int. Cl.
*A01G 25/16* (2006.01)
*A01G 25/00* (2006.01)
*A01G 9/10* (2006.01)

(52) U.S. Cl.
CPC ......... *A01G 25/167* (2013.01); *A01G 9/1086* (2013.01); *A01G 25/00* (2013.01)

(58) Field of Classification Search
CPC .... A01G 25/167; A01G 9/1086; A01G 25/00; A01G 27/02; A01G 2025/003; E01C 3/06; E01C 11/225
See application file for complete search history.

(56) References Cited

U.S. PATENT DOCUMENTS

| 4,034,506 A * | 7/1977 | Kasahara | A01G 31/001 47/64 |
|---|---|---|---|
| 5,472,458 A * | 12/1995 | Ogawa | A01G 9/1086 405/263 |
| 8,440,727 B2 | 5/2013 | Gradek | |
| 2010/0267554 A1* | 10/2010 | Madsen | A01C 1/06 504/100 |
| 2013/0185996 A1* | 7/2013 | Nagamitsu | A01G 1/00 47/58.1 R |
| 2013/0209172 A1 | 8/2013 | Smucker et al. | |
| 2013/0259573 A1* | 10/2013 | Wakita | A01G 7/00 405/107 |

(Continued)

FOREIGN PATENT DOCUMENTS

| CA | 2175088 | 10/1994 |
|---|---|---|
| RU | 2492631 | * 9/2013 |

*Primary Examiner* — Carib Oquendo
(74) *Attorney, Agent, or Firm* — Elan IP Inc.

(57) ABSTRACT

An agricultural water retention system including a subsurface water retention barrier positioned in soil below a root zone of one or more plants; wherein the subsurface water retention barrier consists of a plurality of hydrophobic beads layered in a loosely packed manner; and wherein the subsurface water retention barrier is air permeable. Optionally, there is also included a surface evaporation barrier positioned proximate a surface of the soil, such that the surface evaporation barrier includes at least one layer of hydrophobic beads.

15 Claims, 12 Drawing Sheets

(56) References Cited

U.S. PATENT DOCUMENTS

2013/0283685 A1* 10/2013 Qin .................. A01G 9/02
  47/65.7
2014/0048542 A1* 2/2014 Wakita .............. E01C 11/225
  220/565

* cited by examiner

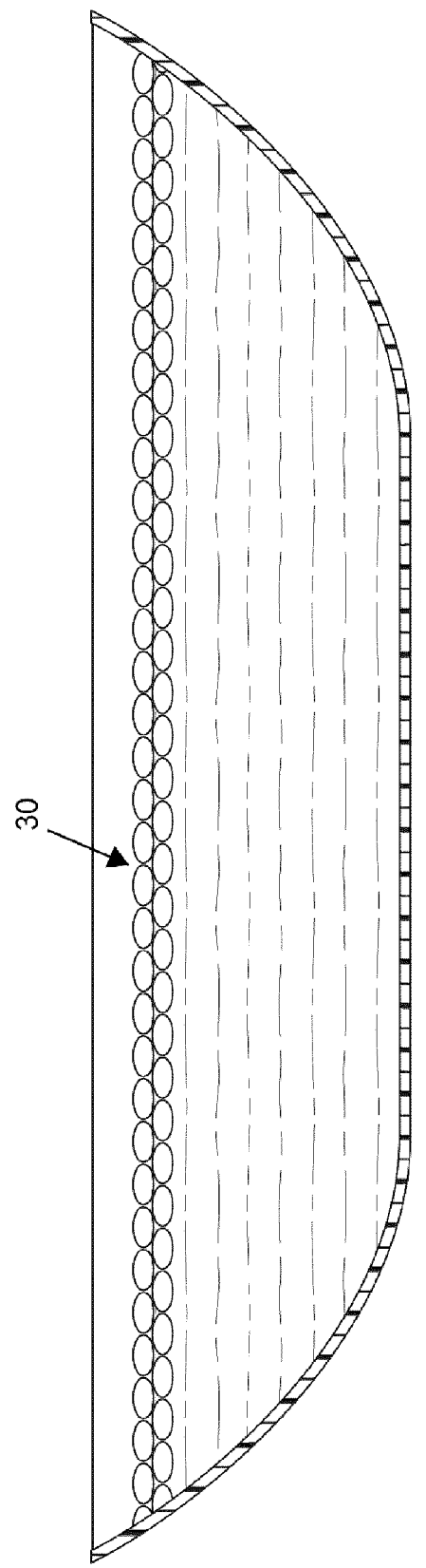

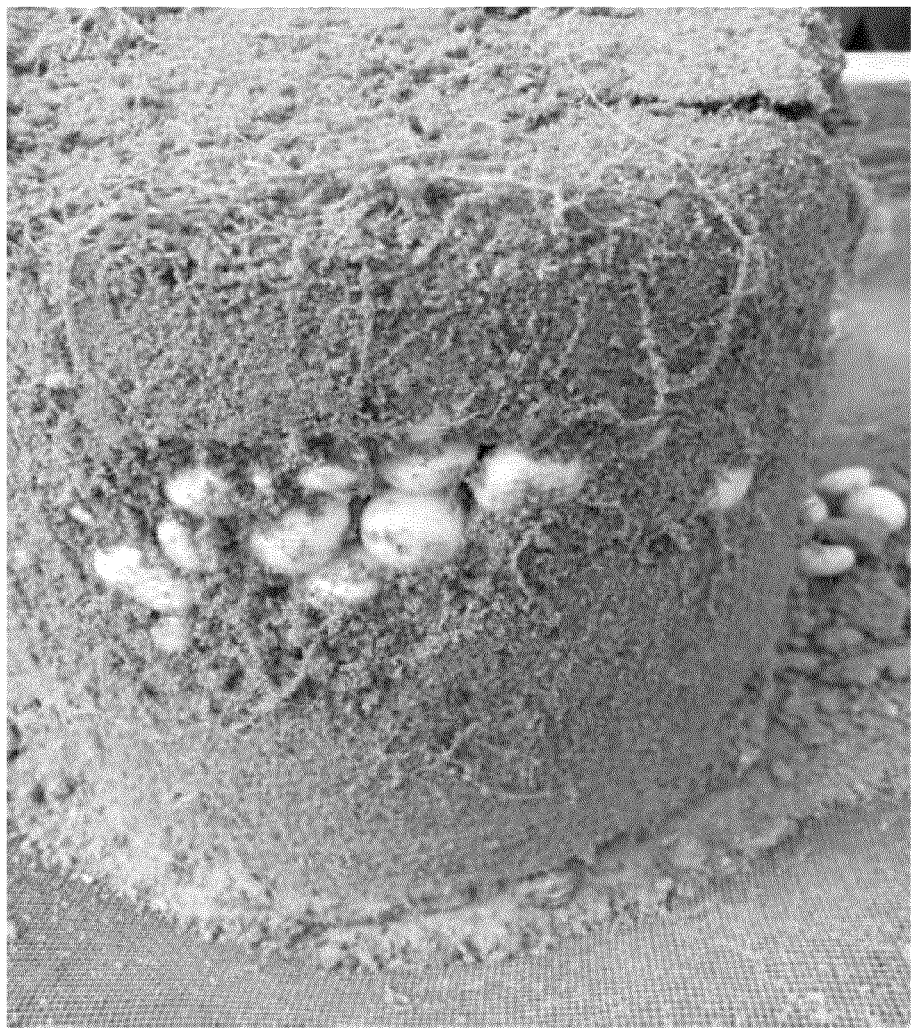
Figure 3: Beads bed at 10 cm depth

Figure 4 : Beads Bed and soil moisture measurements below and above beads layer

Figure 5: Soil moisture measurement above beads layer.

Figure 6: Growth properties of plant roots in control treatments.

Figure 7: Tomato plant growth in treatments with bead layers.

Figure 8: Cucumber plant Growth of control treatments

Figure 9: Cucumber plant growth in treatments with beads bed layer

Figure 10: Tomato plant growth in treatment with beads bed after 96 hours without irrigation

Figure 11: The growth of tomato plants in control treatment after 96 hours without irrigation

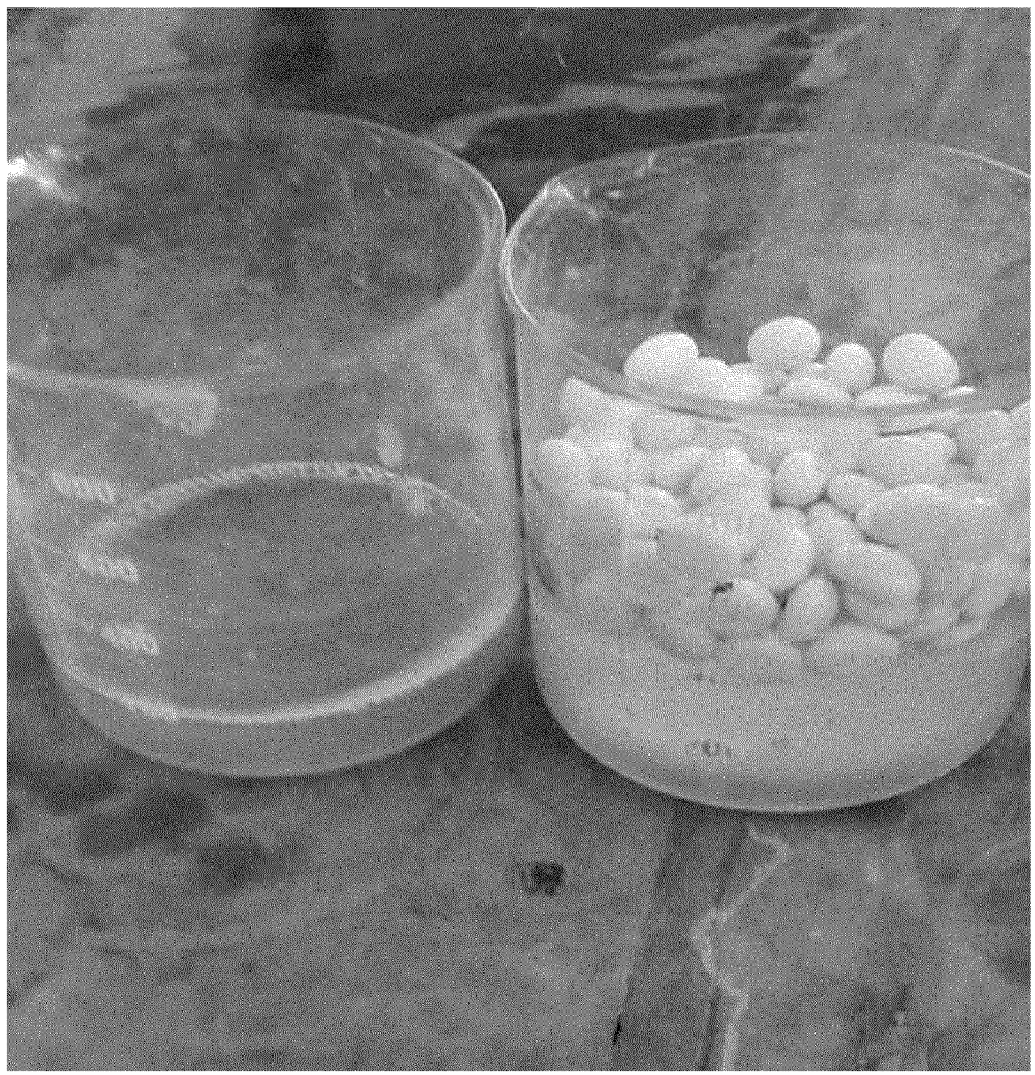
Figure 12: Effect of beads on water evaporation

METHOD AND SYSTEM FOR SURFACE AND SUBSURFACE WATER RETENTION

FIELD OF THE INVENTION

The present invention relates generally to the field of liquid retention and conservation, and more particularly to a method and system for retaining a liquid in a predetermined zone below a surface region or below a subsurface region.

BACKGROUND OF THE INVENTION

Current global usage of fresh water averages about 70% for agricultural purposes and in arid areas such as the middle east, the quantity reaches 85%. Large quantities of the water accounted for agriculture and in the production of food and fibers, is wasted due to poor water retention by sandy and marginally sandy soils. It has been estimated that sandy soil regions require from about 7 to 17 times more water than is actually used to produce maximum food and fiber yields. Similarly, it has been estimated that sandy soil regions retain less than 10% of rainfall in the root zone between the soil surface and 60-70 cm (cm) below the soil surface, with the remaining water draining beyond most root configurations, leaching most plant nutrients and pesticides to depths beyond the roots of food and forage crops.

Soil texture can provide a controlling influence on groundwater quality and quantity. For instance, because precipitation migrates through soil prior to recharging groundwater or outcropping to surface water bodies, water quality is linked to soil quality. Similarly, many issues related to water usage and conservation are linked to water use efficiency in agriculture and to emerging industrial activities in the developing world.

Large areas of land, including more than 23 billion acres of highly permeable soils are located in arid and semi-arid areas of the world. Due to the porosity of the soil, insufficient quantities of water and/or nutrients are retained in the root zones of most plants to maintain sustainable agriculture and grazing landscapes. These water and nutrient deficiencies can be caused by various conditions such as coarse soil texture, poor soil structure, lack of precipitation, or limited available irrigation. Water deficits reduce agricultural efficiency and food production and can have detrimental results, especially when affecting underdeveloped parts of the world. Sub-Saharan Africa, for example, experiences some of the most unfavorable climate inconsistencies and insufficient soil water availability, shortening its growing season and limiting its agricultural production.

As the population of the world continues to grow, the need for using this marginal land for agricultural purposes becomes more pressing. In many areas, good agricultural land is becoming sufficiently scarce so as to create a need for economical and easily applied methods for reclaiming sandy and other porous soils, which would otherwise lack sufficient water retention properties for sustainable agriculture. The growing world population also faces the issue of a depleting supply of high quality water. Rapid drainage of rainwater through soil requires large quantities of water for maintaining agricultural production and causes irregularities in the hydrologic cycle. Furthermore, food supplies are becoming less sufficient in feeding the growing population, creating more competition for the water needed to grow crops.

Current attempts to provide subsurface barriers have failed to address these issues. For example, asphalt barriers were developed to eliminate water percolation to depths below the root zone. However, these barriers also limit root growth through and below the subsurface soils. Additionally, during excessive rainfall, lower regions of the root zone can become saturated, resulting in root disease and death. Additionally, since the asphalt barriers limit root growth below the barrier, plants can easily become water stressed during prolonged periods between rainfall and/or supplemental irrigation activities Yet other systems, require installing strips of plastic, at various soil depths, film or film-forming liquid, non-biological flexible membranes, installed at any desired depth below a surface, such as a soil surface.

One prior art solution in the same relative field is disclosed in United States Publication Number 2013/0209172, published Aug. 15, 2013 to Smucker. This solution faces some of the challenges described herein, as well as others that will become apparent to one skilled in the art.

Other liquid retention problems arise in the storage of water or organic chemicals in open air environments or in storage tank environments which cannot be sealed by virtue of the liquid being stored. Retaining water or organic chemicals below a surface region to mitigate evaporation losses would also be beneficial. In respect of organic chemicals, prior solutions have primarily focused on designing storage tanks in a manner that permits the requisite ventilation.

In general, these and other problems in the art relate to the issue of maintaining a liquid in a predetermined zone below a surface or to maintaining liquid within a predetermined subsurface region to mitigate liquid losses due to evaporation or to drainage of water outside of the predetermined subsurface region.

SUMMARY OF THE INVENTION

It is an object of the invention to provide a water retention system for agricultural use. It is a further object of the invention to provide a liquid retention system useable in other applications.

Accordingly, according to one embodiment of the invention, there is provided an agricultural water retention system comprising a subsurface water retention barrier positioned in soil below a root zone of one or more plants; wherein the subsurface water retention barrier consists of a plurality of hydrophobic beads layered in a loosely packed manner; and wherein the subsurface water retention barrier is air permeable.

According to one aspect of this embodiment the hydrophobic beads comprise a material selected from the group comprising an organic co-polymer, neoprene, urethane, urea, polypropylene, artificial rubbers and plastics.

According to another aspect of this embodiment the hydrophobic beads have a specific gravity of between 0.15-0.25.

According to another aspect of this embodiment the subsurface water retention barrier is between 20-50 mm in thickness.

According to another aspect of this embodiment, the loosely packed manner provides interstitial spaces between individual beads such that drainage between the interstitial spaces occurs when a sufficient water pressure is reached in the soil.

According to another aspect of this embodiment there is further provided a surface evaporation barrier positioned proximate to the surface of the soil; wherein the surface evaporation barrier comprises at least one layer of hydrophobic beads.

According to another aspect of this embodiment the surface evaporation barrier is positioned 20-75 mm below an upper surface of the soil.

According to another aspect of this embodiment the distance between the surface evaporation barrier and the subsurface water retention barrier is at least the length of an ideal root length of a plant being cultivated.

According to a second embodiment of the invention, there is provided an agricultural system having a surface evaporation barrier positioned proximate a surface of soil in which at least plant is cultivated; wherein the surface evaporation barrier consists of at least one layer of a plurality of hydrophobic beads.

According to one aspect of the second embodiment, there is further provided a subsurface water retention barrier positioned in soil below a root zone of one or more plants; wherein the subsurface water retention barrier consists of a plurality of hydrophobic beads layered in a loosely packed manner; and wherein the subsurface water retention barrier is air permeable.

According to another aspect of the second embodiment the hydrophobic beads comprise a material selected from the group comprising an organic co-polymer, neoprene, urethane, urea, polypropylene, artificial rubbers and plastics.

According to another aspect of the second embodiment the hydrophobic beads have a specific gravity of between 0.15-0.25.

According to another aspect of the second embodiment the subsurface water retention barrier is between 20-50 mm in thickness.

According to another aspect of the second embodiment the loosely packed manner provides interstitial spaces between individual beads such that drainage between the interstitial spaces occurs when a sufficient water pressure is reached in the soil.

According to a third embodiment of the invention, there is provided a method for forming an agricultural water retention system including the steps of removing soil to a predetermined depth; depositing at least one layer of hydrophobic beads to form a subsurface water retention barrier; and, backfilling the soil.

According to one aspect of the third embodiment the hydrophobic beads comprise a material selected from the group comprising an organic co-polymer, neoprene, urethane, urea, polypropylene, artificial rubbers and plastics.

According to another aspect of the third embodiment the hydrophobic beads have a specific gravity of between 0.15-0.25.

According to another aspect of the third embodiment the subsurface water retention barrier is between 20-50 mm in thickness.

According to another aspect of the third embodiment after the depositing step, partially backfilling the soil to a position proximate a surface of the soil; and, depositing a second layer of hydrophobic beads to form a surface evaporation barrier.

According to another aspect of the third embodiment the surface evaporation barrier is positioned 20-75 mm below an upper surface of the soil.

According to a fourth embodiment of the invention, there is provided a system for mitigating the evaporation of a liquid from a body of liquid comprising a plurality of hydrophobic beads positioned to float on a top surface of the liquid.

According to one aspect of the fourth embodiment the hydrophobic beads comprise a material selected from the group comprising an organic co-polymer, neoprene, urethane, urea, polypropylene, artificial rubbers and plastics.

According to another aspect of the fourth embodiment the hydrophobic beads have a specific gravity of between 0.15-0.25.

According to another aspect of the fourth embodiment, the hydrophobic beads, can be inserted in a porous envelope or bag. Optionally, these bags can then be attached together when installed atop a liquid surface to form the evaporation barrier.

Preferred embodiments, details of implementation and various test results will be described in the Detailed Description that will follow below.

BRIEF DESCRIPTION OF THE DRAWINGS

Embodiments will now be described, by way of example only, with reference to the attached Figures, wherein:

FIG. 2 is a schematic drawing of a body of water showing another embodiment of the invention.

FIG. 3 shows an experimental implementation of the subsurface retention barrier at a depth of 10 cm.

FIG. 4 illustrates the experimental arrangement used to test moisture levels below the subsurface retention barrier.

FIG. 5 illustrates the experimental arrangement used to test moisture levels above the subsurface retention barrier.

FIG. 6 is a photograph of root growth in a test environment.

FIGS. 8-11 are photographs of tomato and cucumber plant growth in test environments.

FIG. 12 is a photograph of a water evaporation test environment as per another embodiment of the invention.

DETAILED DESCRIPTION

Introduction and Definitions

Figure 1:
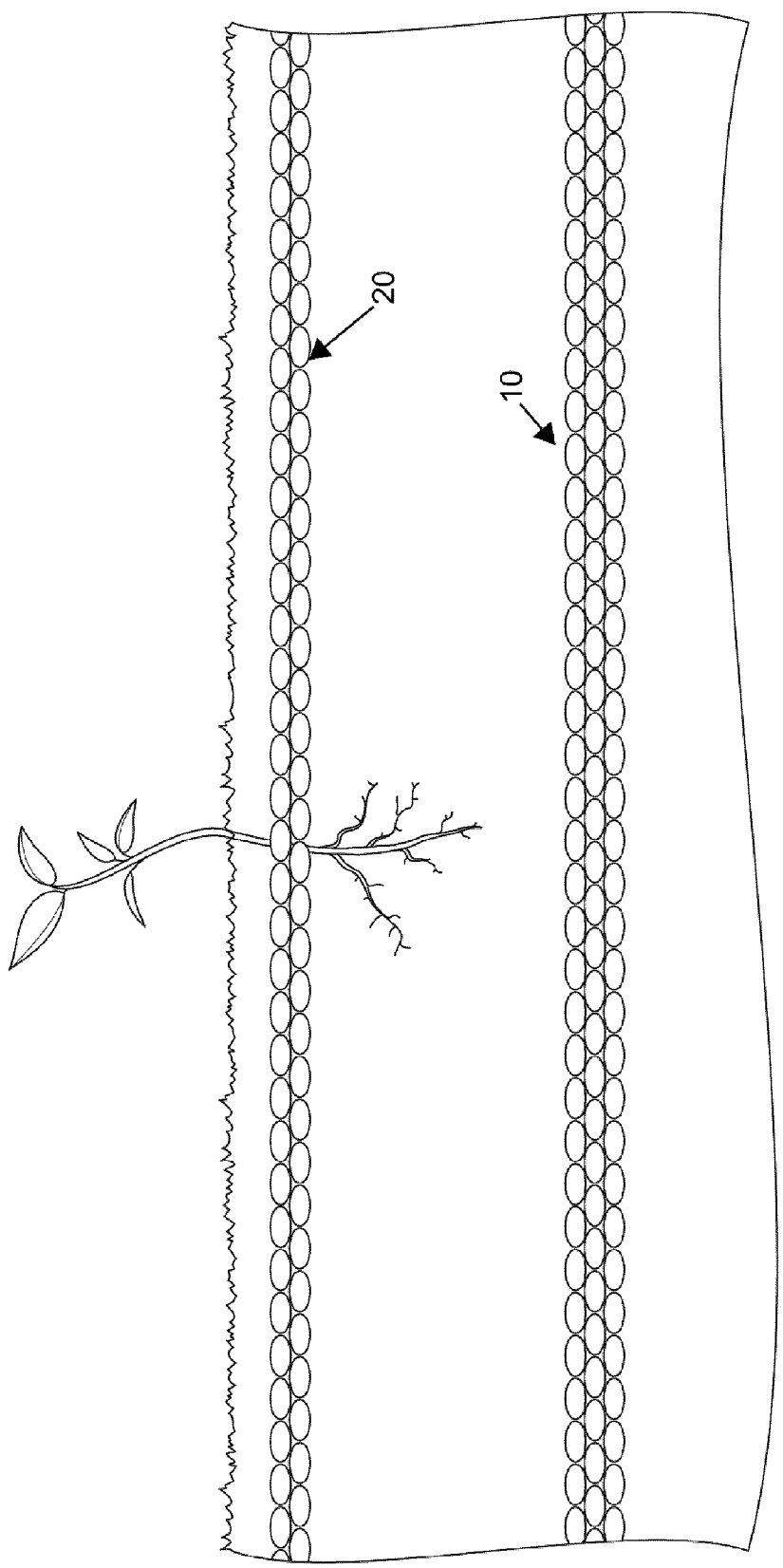
FIG. 1 is a schematic drawing of an agricultural field showing one embodiment of the invention.

Broadly, the invention relates to the use of a plurality of hydrophobic beads to form a loose packed and granular layer on a surface or alternatively in a subsurface region to create a zone in which a liquid is to be retained. These hydrophobic beads are preferably prepared from an organic co-polymer such as those described in U.S. Pat. No. 8,440,727 issued to Thomas Gradek on May 14, 2013, the contents of which are herein incorporated by reference. The beads may be solid, hollow or have a cellular core construction with a solid surface. Examples of suitable materials that may be used in the fabrication of these hydrophobic beads are neoprene, urethane, polypropylene, plastics and artificial rubbers. Applicant has discovered surprising uses and applications of the hydrophobic beads described in the '727 patent, details of which will now follow. However, it is noted that the invention herein described is not limited to the particular beads described in the '727 patent and other beads having hydrophobic properties as herein described are also contemplated. When these hydrophobic beads are formed in loosely packed layers, they provide retention capabilities to water and other organic liquids while still allowing air to pass through the layers of beads. It should be noted that the term "retention" as used herein does not refer to a watertight seal, rather retention is used to denote that a sufficient or suitable amount of liquid is retained for an intended purpose.

The hydrophobic beads described throughout this description preferably have a specific gravity of between about 0.15-0.25, and are therefore fairly buoyant. This allows for separation from soils when immersed in a body of water. At least one suitable approach to separate the beads from the soil would be to remove the soil and the layer of beads, discharge the soil and beads in a vessel containing a sufficient amount of water that would allow the beads to float and the soil to settle. The beads are thus separable from the soil and can be skimmed off the water surface and reused, for example in a different type of soil.

For ease of understanding the various embodiments of the invention, the definitions that now follow may be of assistance.

The term "surface" as used herein refers to an uppermost surface of a medium, which can be liquid or solid. The surface of a liquid medium can be a solid, liquid or combination thereof. The surface of a solid medium can be solid or liquid, or a combination thereof. A solid surface can be, for example, an in situ soil surface or an in situ soil matrix surface.

The terms "subsurface" as used herein, refers to any location beneath, i.e., below, a surface. If the surface is an in situ soil surface or an in situ soil matrix surface located on a planet's surface i.e., on the "ground" such a location is considered to be a "shallow underground" which is within the topsoil at a depth beneath a projected plant root zone, although not so deep as to be in the "subsoil", i.e., the layer of soil under the agricultural topsoil. Put another way, the surface could be the interface between two adjacent mediums and the subsurface a region within one of the mediums.

The term "soil" as used herein, refers to a solid medium, i.e., granular material comprising a biologically active porous medium. Soil is found on, or as part of, the uppermost surface of the Earth's crust and evolves through weathering of solid materials, such as consolidated rocks, sediments, glacial tills, volcanic ash, wind and water deposited minerals and organic matter. Such a soil can include a highly porous and permeable mineral soil, including, but not limited to, Oxisols, Alfasols and sandy soils (i.e., "sand"). Sandy soils are further characterized by a highly permeable "coarse" texture as the term is understood in the art.

The term "soil matrix" as used herein, refers to any plant growth medium, which can include a combination of materials.

The term "root zone" as used herein, refers to that portion of a medium which can penetrated by plant roots. A projected root zone is the maximum root zone expected for a given plant type.

The term "subsurface retention barrier" refers to a barrier disposed under a surface, such as underground in soil or a soil matrix. When installed on planet's surface, the barrier is located beneath and proximate to a projected root zone. With particular reference to the present application, the subsurface retention barrier refers to the layer of hydrophobic beads as herein described.

The term "surface evaporation barrier" refers to a barrier disposed at or just below the surface, at approximately 20-75 mm below the upper surface such as underground in soil or a soil matrix. In the case of a liquid surface, the term "surface evaporation barrier" also refers to a barrier disposed on or floating on the surface.

Preferred embodiments of the invention will now be described, and prefaced with certain headings. The headings listed are to assist in reading the application only, and are not to be used to construe any meaning to the description falling within a particular heading. For example, information pertinent to different aspects or embodiments of the invention may be pieced together from different headings, and parts of the invention are described under their most relevant heading, but may be applicable to portions described under other headings as well.

Applications in Subsurface Water Retention

In one embodiment of the invention, particularly suited to agricultural applications in regions having soil and particularly sandy soils, hydrophobic beads are installed as a subsurface retention barrier beneath the surface at a depth slightly greater than the depth at which the roots of a given plant would reach. This embodiment is shown in FIG. 1. Note that only the beads 10 illustrated in FIG. 1 form the subsurface water retention barrier. The layers of beads 20 are discussed further below. The beads 10 installed as a subsurface retention barrier are typically a plurality of beads, forming a loosely packed granular layer, between about 20-50 mm in thickness. The term loosely packed is used to indicate that the beads are not compressed against each other so that a complete seal is present in the subsurface retention barrier.

As the layer of beads are hydrophobic in nature, they will not absorb water. This ensures that the physical characteristics of the beads are not altered, for example by swelling due to water absorption. The layer of beads, in combination with the soil surrounding and dispersed between the beads, results in most of the water present in the soil above the layer of beads being retained therein. Thus, water in the region of the soil from the surface down to the subsurface retention barrier is more readily available to plant roots present beneath the surface layer.

As will be appreciated by one skilled in the art, installing the layer of beads is a relatively straightforward process as beads can simply be poured or otherwise placed into trenches or other depressions in the soil. Prior art devices relying on films or continuous solid barriers are much more problematic in this regard since more manual labour is required to position films or continuous solid barriers in place. Furthermore, these prior art barriers create a complete separation between the soil above the barrier and the soil below the barrier that is otherwise problematic for the health of the roots, amongst other reasons as would be known to a person skilled in the art.

In addition, providing a layer of beads as described above still allows for internal drainage of saturated soil during periods of excess rainfall as given a sufficient pressure in the soil above the layer of beads, some water will drain through the interstitial spaces between the beads. This pressure is reached when the water retention capacity of the soil in which particular plants are grown becomes supersaturated. Accordingly, the subsurface retention barrier is adapted to retain an appropriate amount of water in relation to the retention capacity of the soil within the root zone of a given plant. Experimental results are provided further below.

It has also been discovered that the controlled subsurface retention capabilities of the layer of beads provides water retention at prescribed depths and within sandy soil profiles that alter the hydropedological water regime. The subsurface barrier can therefore improve water use efficiencies for food and cellulosic biomass crops planted in sandy soil, the result being the more efficient use of sandy soil into highly productive natural landscapes with savings of water, pesticide and fertilizer costs.

Applications in Mitigating Surface Evaporation

Another aspect of subsurface water retention, as applied to the sandy soil in arid climates scenario for example, is the use of a second layer of beads 20 to further reduce the loss of water from evaporation. In this embodiment, a top layer of beads referred to herein as a surface evaporation barrier, is disposed just below the surface, at approximately 20-75 mm below the surface of the soil. The soil between the subsurface barrier and the surface evaporation barrier forms a high moisture zone. Water retention and distribution within the high moisture zone between these two layers (ie. between the subsurface layer of beads and the top layer of beads) is determinative of the soil moisture profile and is governed by the quantity of water above the subsurface layer. Either natural precipitation and/or supplemental irrigation increases the water content of the soil to near saturation. The gradients of plant-available water distributed within the soil profile above the subsurface layer are controlled by the permeability and capillary lift capacities of the pores within the sand and above the subsurface layer. The overall distance between the subsurface layer and the surface evaporation barrier layer will preferably equate to slightly more than the ideal root depth of the plant.

It will also be appreciated that the surface evaporation barrier can be a single layer of beads thick, but may be up to several layers of beads thick. The surface evaporation barrier does not prevent water from entering the soil as once there is sufficient water build-up on the beads, water will drip into the soil. Optionally, the surface evaporation barrier may not cover an entirety of the top surface, in which case only partial evaporation mitigation will occur. While this option is not preferred, it still does improve upon prior art arrangements.

Combining the Subsurface and Surface Barriers

More specifically, for general agricultural purposes, the subsurface water retention layer is disposed sufficiently deep to permit soil surface cultivation without disturbing the beads forming the subsurface water retention layer. However, the subsurface water retention layer should not be so deep that the water trapped or retained above this layer of beads will not nourish the roots of the plant. The depth of the subsurface layer will vary with the type of plant grown in the root zone, but this depth will become apparent to one skilled in the art in view of the teachings of the invention. The surface evaporation layer of beads is placed below the surface, as mentioned above, so that there is a minimum amount of soil above the surface evaporation layer to prevent or mitigate against the displacement of beads by environmental forces, such as wind and rain. With this in mind, it is noted that this aspect of the invention is not limited to having the surface evaporation layer being disposed below the surface, and positioning the beads at or on the surface is within the realm of the teachings and scope of the invention. For example, in conditions where environmental factors that may displace the beads are not an issue, the beads could certainly be placed at or on the surface.

By way of contrast, the surface evaporation layer has as its primary purpose the reduction of evaporation losses at the soil surface, whereas the subsurface retention has as its primary purpose the retaining of a predetermined moisture content in the soil, and secondarily the elimination of the potential for water flooding in the soil. The elimination of water flooding occurs once a threshold pressure has been reached on the beads such that moisture condenses in the spaces between the beads and ultimately drips below the subsurface layer. This phenomenon has been observed by applicant and in experiments appears to function sufficiently over extended periods of time. Once water flooding or saturation is no longer problematic, by virtue of the dripping described above, the steady state of maintaining the moisture content in the soil returns.

It is also advantageous to maintain a suitable oxygen level in the soil to aerobically biodegrade bacteria, such that the soil will maintain its health status. It is known that the removal of oxygen from the root system will lead to an increase in bacteria, and the spread of disease, whereas if the soil oxygen diffusion rate is above a determinable threshold, the plant health and thus the plant growth rate will be at suitable and sustainable levels.

Preferably, the subsurface retention barrier is located sufficiently deep in the soil to permit surface soil cultivation without disturbing the subsurface retention barrier, however the subsurface retention barrier should not be located so deep that the roots of the plant will not be nourished by the retained moisture. That is, the subsurface retention barrier must not be too deep that the desired moisture content is lost by virtue of the amount of soil between the surface and the subsurface retention barrier. The specific depth will vary with the type of plant grown in the root zone. Water retention and distribution within the portion of the soil profile is governed by the quantity of water at the surface of the subsurface barrier. In ideal circumstances, either natural precipitation and/or supplemental irrigation increases the soil water contents to near saturation. The gradients of plant-available water distributed within the sandy soil profile above the subsurface barrier are controlled by capillary lift capacities by the pores within the sand above the subsurface barrier.

In certain embodiments, the subsurface retention barrier provides water retention within sandy soil profiles in a pattern that alters the hydropedological water regime. Installed subsurface barriers as herein described may improve water use efficiencies by up to 20-fold, such as for food and cellulosic biomass crops. In other applications, the subsurface retention barriers are adapted to bring marginally sandy soil into highly productive natural landscapes with substantial savings of water and fertilizer costs.

It will now be apparent to one skilled in the art that the invention as herein described provides a water saving system comprising a porous barrier to provide long-term reversal of water and nutrient losses from the root zones of plants growing in sandy soils.

The subsurface water retention barrier described herein also has the potential to reduce excessive use of water resources for agricultural purposes by allowing a more equal distribution of water to larger amounts of land, thus slowing the process of desertification. The system can also lessen nutrient leaching by improving soil moisture content in the root zone. By preventing the quick drainage of water through the soil, the novel system described herein increases the volume of water readily available for absorption by roots. With greater soil water content, plants require fewer numbers of roots to attain an adequate amount of water, so less of the plant's energy is used for root growth and more energy can be used for above ground plant growth. Retention of nutrients can additionally be achieved.

When placing the subsurface retention barrier in place, beneath a surface medium, soil is first removed to a specific depth, for example by excavation, and a layer of the beads as herein described is deposited to form the subsurface retention barrier. The excavation area is then backfilled with the surface medium soil. The surface evaporation layer can also be installed in a similar manner.

Other Applications

As shown in FIG. 2, it is also contemplated that the retention barrier formed of the beads as herein described may be used to limit or to eliminate evaporation from bodies of water, or from liquids such as organic liquids being stored in open-air environments or in other environments where evaporation is of concern. In these implementations, a layer of beads 30 may be positioned floating on a surface of the liquid. Where storage of the liquid is required in an open air environment, the surface evaporation barrier of the present invention may be particularly helpful. This application may also be applied to storage in large tanks that are not otherwise considered to be open air environments.

In one variation of this implementation, rather than floating directly atop a body of water, a plurality of beads are contained within a porous mesh material envelope to retain the beads so as to form a porous medium. Each of these porous mesh envelopes, or bags, can then be attached together to form a floating evaporation barrier. This has the advantage of permitting easier transport and installation of the evaporation barrier of this embodiment. The porous mesh material forming the envelop or bag can be any number of materials, although a preferred form of the envelope may that shown in Canadian Patent Application No. 2,175,088 filed Oct. 25, 1994 by Thomas Gradek.

Example and Test Data

Summary of Test

An experiment was conducted to evaluate the role of the beads as herein described in protecting, regulating and saving plant irrigation water when used as a soil retention barrier bed at a specific depth in Sandy soil. The plant growth and water retention were evaluated through vegetative plant growth, including plant height and dry and fresh weight and moisture contents of soil after irrigation within different time periods (0-72 hrs.). The experiment involved planting two types of plants (Tomato and Cucumber) for 5 Weeks. The layers of beads caused protection of about 50% water and about 30% water after 24 and 72 hours of irrigation, respectively. The vegetative plant part was also improved with the use of beads, the height of the plant improved by >20% and the root mass decreased by about 30%. The beads also, reduced the evaporation of water by >50% as well as, preventing the growth of mold and algea in a water storage container.

Introduction

Hot climate and soil characteristics such as sandy soil and water evaporation, and the variability of rainfall coupled with water distribution in different soils result in a large influence over soil moisture content and on plant growth as well. In such environments, water retention and soil water availability for plant growth along with the growing season showed how much water catchment or water release from soil are considered as key factors in planting of lands during growing seasons. Water retention by soil depends on soil properties, regional climate, biota, and area topography and can be controlled by vegetation, water holding materials and soil depth. Middle East and Gulf countries are arid and semiarid countries and considered facing most water shortages for drinking and for agricultural purposes. Topography has little influence on water retention in arid and semi-arid environment. These countries are depending totally on ground water, dams and on water desalination plants as the major water supply sources.

Also, the increase in demand for drinking water and agricultural water, requires the use of sustainable methods in water management particularly in Sandy soil areas. Under such condition, these countries are seeking environmentally sustainable processes to manage and use water for agricultural, landscaping, and planting green tree belts with highly managed water use.

Therefore, the objectives of the present project were evaluating the role of using the beads in water management in both agriculture and landscaping use, evaluating the effect of using the beads on plant growth parameters such as plant growth performance including plant height and, dry and fresh weight, evaluating the effects of irrigation process using the beads bed on tomato and cucumber, and alfalfa crops and to evaluate the effect of a beads top layer on reducing the water evaporation process.

Materials And Methods

The experiment was conducted at a greenhouse at Mutah University, Faculty of Agriculture, Karak-Jordan between April and May, 2013. The seedlings of Tomato and Cucumber plants were the top diameter of the plastic plant pot is 20 cm, and the depth 20 cm. The diameters of the plastic pot at depths of 3, 6, 10, and 13 cm. from the top were 18.5, 17.0, 16.0, and 15.0 cm., respectively. The plants were irrigated with 500 ml of water every 3 days. The moisture content of the soil and growth parameters were monitored, measured and evaluated for the control and the treatments through measuring plant height, and dry and fresh weight during and at the end of the experiment period of 5 weeks. Soil moisture content was measured during and at the end of the experiment using AJ-Moisture meter (Detta-T device, Cambridge, England) with Theta-Probe type ML2X (FIGS. 3, 4, 5, 6)

Statistical Analysis

Results obtained will be evaluated using Completely Randomized Block Design (CRBD) with three replications using LSD for computing the significant differences in water consumptions and plant parameters of the two crops.

Results

The data obtained from determining water retention (WR) and plant characteristics of the current study are presented in Tables 1, 2, 3 and 4 and FIGS. 3 to 11. It can be noted from Tables 1 and 2 that WR was highly affected by the placement of beads bed at either 10 or 13 cm depth in soil compared to control treatments without bead bed. The measurement data for both plants followed the same trend in growing either tomatoes or cucumber plant. WR was highly affected with the depth of beads bed as shown in Table 2 that varies with point different.

TABLE 1

Effect of Gradek beads on water Retention of Sandy soil

| Treatment[1] | Soil Moisture Content (SMC)[2] % v/v | | | | | | | | | |
|---|---|---|---|---|---|---|---|---|---|---|
| | SMC_0 | SMCAI_0 | SMCAI_6 | SMCAI_12 | SMCAI_24 | SMCAI_48 | SMCAI_72 | SMCAI_96 | HTS (cm) | HTE (cm) |
| TB1 | 2.7 ± 0.17 | 25.3 ± 1.47 | 23.1 ± 6.05 | 19.4 ± 1.2 | 18.3 ± 2.93 | 13.9 ± 1.61 | 9.1 ± 3.03 | 6.7 ± 1.22 | 17.5 ± 0.76 | 39.3 ± 2.3 |
| TB2 | 3.0 ± 0.37 | 24.33 ± 2.31 | 21.2 ± 5.31 | 20.2 ± 6.3 | 19.7 ± 1.08 | 13.1 ± 0.81 | 10.1 ± 2.07 | 5.3 ± 0.69 | 15.7 ± 2.37 | 36.3 ± 1.3 |
| TC | 3.1 ± 0.10 | 22.9 ± 0.30 | 18.8 ± 0.75 | 15.8 ± 0.7 | 12.1 ± 0.16 | 10.3 ± 0.50 | 6.9 ± 0.21 | 3.2 ± 0.11 | 15.8 ± 0.05 | 32.01 ± 1.1 |
| CB1 | 2.9 ± 0.05 | 25.3 ± 2.30 | 23.4 ± 2.10 | 21.5 ± 1.5 | 13.2 ± 3.10 | 13.5 ± 0.05 | 10.1 ± 0.55 | 6.4 ± 0.15 | 16.5 ± 0.40 | 39.1 ± 2.1 |

TABLE 1-continued

Effect of Gradek beads on water Retention of Sandy soil

| Treatment[1] | Soil Moisture Content (SMC)[2] % v/v | | | | | | | | HTS (cm) | HTE (cm) |
|---|---|---|---|---|---|---|---|---|---|---|
| | SMC_0 | SMCAI_0 | SMCAI_6 | SMCAI_12 | SMCAI_24 | SMCAI_48 | SMCAI_72 | SMCAI_96 | | |
| CB2 | 3.6 ± 0.1 | 26.1 ± 0.51 | 20.3 ± 1.05 | 20.0 ± 0.5 | 11.1 ± 0.50 | 10.2 ± 0.61 | 10.5 ± 0.52 | 7.8 ± 0.55 | 19.2 ± 0.50 | 42.5 ± 1.5 |
| CC | 4.1 ± 0.11 | 23.5 ± 0.51 | 18.2 ± 0.7 | 17.5 ± 0.7 | 9.8 ± 1.10 | 8.2 ± 1.12 | 5.4 ± 1.50 | 3.6 ± 0.22 | 15.5 ± 1.31 | 30.6 ± 2.4 |

[1]TB1: Tomato plant with beads at 10 cm depth: TB2: Tomato plant with beads placed at 15 cm depth: TC: Tomato plant without beads as a control treatment; CB1: cucumber plant with beads at 10 cm depth: CB2: cucumber plant with beads placed at 15 cm depth: CC: cucumber control treatment without beads.
[2]SMC-0: soil moisture content at zero time: SMCAI-0: soil moisture content after irrigation at zero time; SMCAI-6: soil moisture content after 12 hour of irrigation: SMCAI-24: soil moisture content after 24 hour of irrigation; SMCAI-48: soil moisture content after 48 hour of irrigation; SMCAI-72: soil moisture content after 72 hour of irrigation: SMCAI-96: soil moisture content after 96 hour of irrigation: HTS: plant height in cm at planting time; and THE: plant height in cm after four weeks.

TABLE 2

Water retention of sandy soils measured at two levels below and above Gradek Beads layers after 48 hr of irrigation.

| Treatment[1] | Moisture content (% v/v)[2] | |
|---|---|---|
| | 6 cm | 15 cm |
| TC_48 | 8.3 ± 0.8 | 12.13 ± 0.3 |
| TB1-48 | 14.1 ± 1.3 | 6.60 ± 0.1 |
| TB2-48 | 18.4 ± 1.5 | 11.03 ± 0.1 |
| CC-48 | 7.4 ± 0.8 | 12.90 ± 0.2 |
| CB1-24 | 10.3 ± 1.1 | 8.01 ± 2.0 |
| CB2-0 | 25.2 ± 4.0 | 14.61 ± 3.0 |

[1]TC-48: Tomato control soil moisture content after 18 hour of irrigation: TB-48: Tomato soil moisture content with beads measured after irrigation at zero tim48 hour of irrigation: TB2-48; Tomato soil moisture content with beads placed at 13 cm depth: CC-48: Cucumber soil moisture content with beads without beads; CB1-48: cucumber soil moisture content with beads placed at 10 cm after 48 hour of irrigation: CB2-0: cucumber soil moisture content with beads placed at 10 cm measured after 1 hour of irrigation.
[2]6 cm: moisture content measured at depth of 6 cm and 14 cm: moisture content measured at depth of 15 cm.

TABLE 3

Effect of using Gradek beads on water retention and on the growth of tomato and cucumber plants.

| Treatment[1] | Root weight (g) | Root length (cm) | Shoot fresh weight (g) | Shoot plant height (cm) |
|---|---|---|---|---|
| TC | 9.1 ± 4.3 | 18.3 ± 0.7 | 22.1 ± 2.7 | 31.3 ± 0.7 |
| TB1 | 12.6 ± 1.7 | 12.3 ± 4.5 | 29.5 ± 1.9 | 40.3 ± 2.3 |
| TB2 | 9.3 ± 3.1 | 14.3 ± 4.6 | 32.9 ± 7.3 | 39.3 ± 12.6 |
| CC | 3.6 ± 1.2 | 16.7 ± 0.6 | 25.3 ± 5.1 | 36.1 ± 4.6 |
| CB1 | 3.4 ± 1.1 | 11.2 ± 0.7 | 34.2 ± 1.1 | 41.0 ± 1.0 |
| CB2 | 3.7 ± 2.3 | 10.4 ± 0.5 | 30.3 ± 1.0 | 42.33 ± 2.1 |

[1]TC: Tomato plant grown in soil without beads and used as a control treatment TB1: Tomato plant grown in soil with beads placed at 10 cm depth; TB2: Tomato plant grown in soil with beads placed at depth of 15 cm; CC: cucumber plant grown without beads and used as a control treatment CB1: cucumber plant grown in soil with beads placed at depth of 10 cm; and CB: cucumber plant grown in soil with beads placed at 15 cm depth.[1]

TABLE 4

Effect of using Gradek beads on water retention and on the dry weight of roots and shoots of tomato and cucumber plants.

| Treatment[1] | Root Dry weight (g) | Shoot dry weight (g) |
|---|---|---|
| TC | 1.35 ± 0.24 | 1.12 ± 0.08 |
| TB1 | 0.60 ± 0.21 | 3.61 ± 0.51 |
| TB2 | 1.18 ± 0.06 | 4.21 ± 0.36 |
| CC | 0.26 ± 0.03 | 1.72 ± 0.14 |
| CB1 | 0.12 ± 0.1 | 1.74 ± 0.18 |
| CB2 | 0.32 ± 0.1 | 2.28 ± 0.26 |

[1]TC: Tomato plant grown in soil without beads and used as a control treatment: TB1: Tomato plant grown in soil with beads placed at 1 cm depth; TB2: Tomato plant grown in soil with beads placed at depth of 15 cm; CC: cucumber plant grown without beach and used as a control treatment: CB1: cucumber plant grown in soil with beads placed at depth of 10 cm; and CB2: cucumber plant grown in soil with beach placed at 15 cm depth.[1]

Discussion

The results of this data show that at the presence of beads as a bed at different levels of the sandy soils support effectively the growth and WR all over the growth period of tomato and cucumber plants. This may also cause positive effect in soil aeration and protection against any infestation and distribution of plant diseases. Practically, the soil treatment with beads suggested to be used as WR support materials to save large amount of water that was usually lost as a result of hot climate condition. The relationships between water, moisture content and time of irrigation were positive with greater than 30% water saving compared with control treatment. For example, the moisture content of sandy soil after irrigation of 500 mL water and measured after 12 hours were 19.4% compared to 15.8% moisture of the control that means WR of >18% and 50% after 24 hour from irrigation time (Table 1).

Moisture content of soil of the treatment TB1 after irrigation by 48 hr was 6% greater than control treatment (Table 2). This could be explained by the presence of beads bed at either 10 or 13 cm depth that provide protection from releasing water below the level of the beads bed. Additionally, the level of beads bed depth, protect and prevent the release of water to a level of not greater than 40%. The growth parameters of root or shoot length and weight (gm), showed that using beads bed improved the plant height and reduced root weight and length when compared with control treatments. The root length and shoot plant height of treatment TB1 were 12.3 cm and 40.3 cm compared to control group of 18.3 cm and 31.3 cm, respectively, for plant root and shoot (Table 3). This could be explained as the availability of water for plant growth near the root of the plant, support plant growth and thus as expected increase the production. Dry weight also affected by the presence of the beads bed (Table 4). For example, the dried weight of plant root was found 1.35 gm for the control and 1.12 for the shoot, while the root weight of TB1 was 0.6 gm and 3.6 gm of the plant shoot.

Water evaporation was tested and found that greater than 60% of water was saved from evaporation compared to controlled treatment (FIG. 12).

Conclusion

The layers of beads as herein described improve water retention and reduced water evaporation which means that water goes through growing pot without beads faster than in the pot with beads. Water evaporation was reduced thus water saved for agricultural purposes compared with those without beads. Two layer beads suggested improving better water retention than one layer of 1 to 2 cm bed thickness. Moreover, the growing of plants in an open area with beads bed will improve the growth of the plant better than growing in the controlled pot environment. Preliminary testing has also confirmed that these results are also expected in larger scale agricultural implementations, as the physical and chemical characteristics and interactions of the water, soil and plants correspond in the test and real-world environments.

Concluding Comments

The invention has been described with reference to specific examples and test data as available to the applicant on the date of filing this application. However, the invention is limited only by the claims that follow, with various variations and modifications being made possible. For example, the characteristics of the beads as herein described may vary from the specific examples given, provided the results and outcomes are the same. Furthermore, specific implementations of the invention will become readily adaptable by one skilled in the art based on their knowledge of the growth of plants, desired root depth and water required by specific types of plants. In this regard, the exemplary depth of the subsurface retention barrier or the positioning of the surface evaporation layer may readily be varied by one skilled in the art. In other example, the invention may be applied in greenhouse environments, home and community gardens where the surface evaporation layer may also provide a deterrent to weed and other unwanted plant growth.

The scope of the claims should not be limited by the preferred embodiments set forth in description of the preferred embodiments or in the examples, but should be given the broadest interpretation consistent with the description as a whole.

The invention claimed is:

1. An agricultural water retention system comprising a subsurface water retention barrier positioned in soil below a root zone of one or more plants; wherein said subsurface water retention barrier consists of a plurality of hydrophobic beads layered in a loosely packed manner; and wherein said subsurface water retention barrier is air permeable, wherein soil above said water retention barrier is indistinguishable from soil immediately below said water retention barrier; and wherein said hydrophobic beads have a specific gravity of between 0.15-0.25.

2. The agricultural water retention system according to claim 1, wherein said hydrophobic beads comprise a material selected from the group comprising an organic co-polymer, neoprene, urethane, urea, polypropylene, artificial rubbers and plastics.

3. The agricultural water retention system according to claim 1, wherein said subsurface water retention barrier is between 20-50 mm in thickness.

4. The agricultural water retention system according to claim 1, wherein said loosely packed manner provides interstitial spaces between individual beads such that drainage between said interstitial spaces occurs when a sufficient water pressure is reached in the soil.

5. The agricultural water retention system according to claim 1, further comprising a surface evaporation barrier positioned proximate a surface of the soil; wherein said surface evaporation barrier comprises at least one layer of hydrophobic beads.

6. The agricultural water retention system according to claim 5, wherein said surface evaporation barrier is positioned 20-75 mm below an upper surface of the soil.

7. The agricultural water retention system according to claim 5, wherein the distance between said surface evaporation barrier and said subsurface water retention barrier is at least the length of an ideal root length of a plant being cultivated.

8. An agricultural water retention system comprising a surface evaporation barrier positioned proximate a surface of soil in which at least plant is cultivated; wherein said surface evaporation barrier consists of at least one layer of a plurality of hydrophobic beads, wherein said hydrophobic beads have a specific gravity of between 0.15-0.25.

9. The agricultural water retention system according to claim 8, further comprising a subsurface water retention barrier positioned in soil below a root zone of one or more plants; wherein said subsurface water retention barrier consists of a plurality of hydrophobic beads layered in a loosely packed manner; and wherein said subsurface water retention barrier is air permeable.

10. A method for forming an agricultural water retention system comprising removing soil to a predetermined depth;
depositing at least one layer of hydrophobic beads to form a subsurface water retention barrier; and,
backfilling said soil;
wherein said hydrophobic beads comprise a material selected from the group comprising an organic co-polymer, neoprene, urethane, urea, polypropylene, artificial rubbers and plastics and,
wherein said hydrophobic beads have a specific gravity of between 0.15-0.25.

11. The method according to claim 10, further comprising, after said depositing step, partially backfilling said soil to a position proximate a surface of the soil; and, depositing a second layer of hydrophobic beads to form a surface evaporation barrier.

12. A water retention system comprising a surface evaporation barrier positioned proximate a surface of a medium above a root zone of one or more plants; wherein said surface evaporation barrier comprises at least one layer of hydrophobic beads; wherein said hydrophobic beads comprise a material selected from the group comprising an organic co-polymer, neoprene, urethane, urea, polypropylene, artificial rubbers and plastics; and wherein said hydrophobic beads have a specific gravity of between 0.15-0.25.

13. The system according to claim 12, wherein said hydrophobic beads are contained within a porous mesh envelope to retain said beads so as to form a porous medium.

14. The system according to claim 13, wherein two or more of said envelopes are attached together to form a floating evaporation barrier.

15. The system according to claim 12, wherein the medium is a liquid.

* * * * *